(12) United States Patent
Cueva et al.

(10) Patent No.: US 11,073,889 B2
(45) Date of Patent: Jul. 27, 2021

(54) APPARATUS AND METHOD FOR PROVIDING GRAPHICS PROCESSING UNIT (GPU) BASED POWER SHIFTING FOR USB DEVICES

(71) Applicant: ATI TECHNOLOGIES ULC, Markham (CA)

(72) Inventors: Vincent Cueva, Markham (CA); Gia Tung Phan, Toronto (CA)

(73) Assignee: ATI Technologies ULC, Markham (CA)

( * ) Notice: Subject to any disclaimer, the term of this patent is extended or adjusted under 35 U.S.C. 154(b) by 54 days.

(21) Appl. No.: 16/370,452

(22) Filed: Mar. 29, 2019

(65) Prior Publication Data

US 2020/0310522 A1    Oct. 1, 2020

(51) Int. Cl.
| G06F 1/00 | (2006.01) |
| G06F 1/3228 | (2019.01) |
| G06F 1/26 | (2006.01) |
| G06F 1/3296 | (2019.01) |
| G06F 1/3209 | (2019.01) |

(52) U.S. Cl.
CPC ............ *G06F 1/3228* (2013.01); *G06F 1/266* (2013.01); *G06F 1/3209* (2013.01); *G06F 1/3296* (2013.01)

(58) Field of Classification Search
CPC ....... G06F 1/266; G06F 1/3228; G06F 1/3296
See application file for complete search history.

(56) References Cited

U.S. PATENT DOCUMENTS

| 2013/0268789 A1* | 10/2013 | Yang | G06F 1/3278 |
| | | | 713/323 |
| 2015/0355692 A1* | 12/2015 | Paul | G06F 1/3206 |
| | | | 713/322 |
| 2016/0352101 A1* | 12/2016 | Koo | H02J 1/102 |
| 2018/0275738 A1* | 9/2018 | Pawar | G06F 1/266 |

* cited by examiner

*Primary Examiner* — Nitin C Patel
(74) *Attorney, Agent, or Firm* — Faegre Drinker Biddle & Reath LLP

(57) ABSTRACT

A computing device and method controls power consumption of a graphics processing unit in the computing device by the GPU determining an allocated power for the USB device connected through a USB port, such as a USB-C port. The GPU issues allocated power information for the external USB device to cause the allocated power to be provided to the USB device and includes issuing allocated power information to a power delivery (PD) controller that is connected to a USB port. In some implementations, the GPU shifts at least a portion of the allocated power from the USB device back to the GPU in response to a usage change event associated with the USB device for improving GPU performance. The usage change event can be a disconnect event of the USB device, a power renegotiation event between the USB device and the GPU, or any other suitable usage change event.

20 Claims, 8 Drawing Sheets

APPARATUS AND METHOD FOR PROVIDING GRAPHICS PROCESSING UNIT (GPU) BASED POWER SHIFTING FOR USB DEVICES

BACKGROUND OF THE DISCLOSURE

Computing devices such as laptops, tablets, smartphones, game consoles, televisions, set top boxes and other devices have universal serial bus (USB) ports such as USB-C ports that connect to external USB devices. USB devices may include for example, portable devices that obtain power from the computing device. For example, when a virtual reality headset is connected to a computing device, the virtual reality headset may obtain its power from the computing device through the USB-C port.

Some computing devices allocate a portion of total system power to the USB device. However, when the USB device does not use its allocated power, performance of subsystems within the computing device, such as graphics subsystems that employ graphics processing units (GPUs), or other subsystems may have reduced performance due to the unused power allocated to the USB device. Accordingly, there exists a need for improved computing device operation when USB devices are supported.

BRIEF DESCRIPTION OF THE DRAWINGS

The implementations will be more readily understood in view of the following description when accompanied by the below figures, wherein like reference numerals represent like elements, and wherein.

DETAILED DESCRIPTION OF IMPLEMENTATIONS

Figure 1:
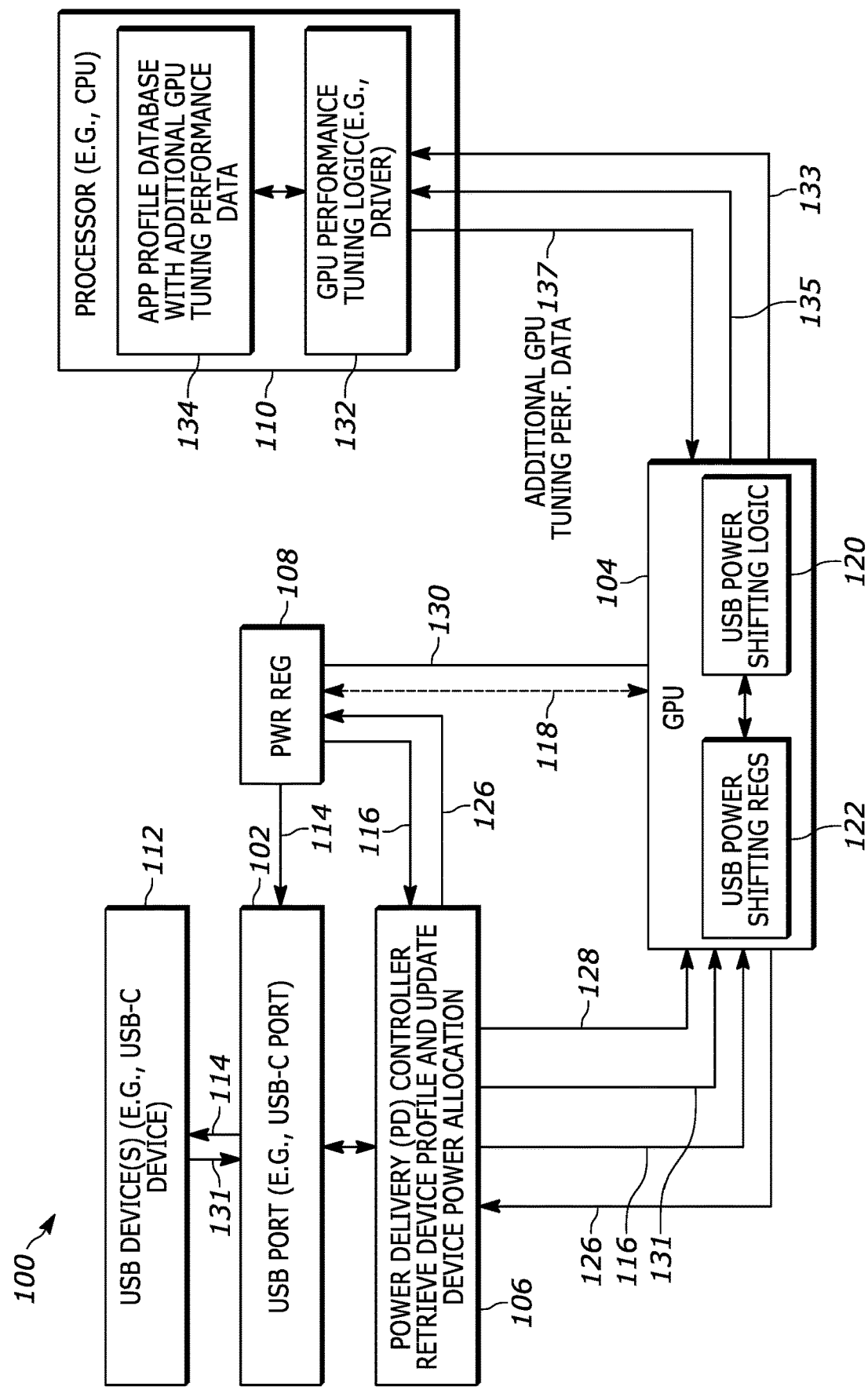
FIG. 1 is a block diagram illustrating one example of a computing device in accordance with one example set forth in the disclosure.

Briefly, a computing system employs a graphics processing unit (GPU) that employs a USB power shifting operation. In one example, a static approach is used by the graphics processing unit to allocate power to a USB device and shifts allocated power back from the USB device to the graphics processing unit based on usage change events such as connectivity events. In some examples, a magnitude of the USB allocated power remains constant. In some implementations, a GPU based USB power shifting operation employs a dynamic approach instead of, or in addition to, the static approach wherein the magnitude of the USB allocated power changes upon request from the USB device for a new power level. In some implementations, the USB allocated power is repeatedly adjusted and shifted between the GPU and the USB device based on USB device operational requirements and GPU performance requirements in view of one or more applications that are employing the GPU. In other examples, real time monitoring of USB device power level is employed to provide a type of real time power level allocation operation between the GPU and the USB device. By employing a GPU with USB power shifting logic, GPU control of power shifting reduces costs, and can increase GPU performance by eliminating external chips to control GPU power shifting between the GPU and USB devices and also increases GPU performance with increased power levels unused by the USB device. Other technical advantages will be recognized by those of ordinary skill in the art.

In some implementations, a computing device and method controls power consumption of a graphics processing unit in the computing device by the GPU determining an allocated power for the USB device connected through a USB port, such as a USB-C port. The GPU issues allocated power information for the external USB device to cause the allocated power to be provided to the USB device and includes in some examples, issuing allocated power information to a power delivery (PD) controller (e.g., a power delivery chip) that is connected to a USB port. In some implementations, the GPU shifts at least a portion of the allocated power from the USB device back to the GPU in response to a usage change event associated with the USB device. The usage change event can be a disconnect (or connect) event of the USB device, a power renegotiation event between the USB device and the GPU, or any other suitable usage change event.

In some implementations, the GPU shifts at least a portion of the allocated power back to the external device in response to another usage change event such as a reconnection of the device to the USB port, or a power renegotiation event wherein the external device asks for more or less power. In some implementations, the GPU determines the allocated power for the USB device based on usage requirements of both the GPU and based on usage requirements of the external USB device. The GPU shifts a portion of the allocated power from the external USB device to the GPU by, for example, maintaining an amount of total allocated power constant or changing an amount of allocated power upon request from the external device.

In other implementations, a dynamic approach is used wherein the GPU uses the allocated power to change a performance level of the GPU. Another processor, such as a central processing unit (CPU) for example, or any other suitable device, determines additional GPU tuning performance data such as desired pixel render quality, frame rate preference, and/or other requirements that an application executing on the processor wants from the GPU. In some examples, the determination of the additional GPU tuning performance data is based on available GPU power and the power that is provided to the USB device. In response to the determination, the method includes changing the GPU performance level using the additional GPU tuning performance data.

In other implementations, periodic real time monitoring of external device power requirements is also provided wherein the GPU shifts at least a portion of the allocated power by obtaining actual power consumption data of the USB device, when the USB device has been allocated power. The method also includes, based on the power consumption data of the USB device, changing an amount of power allocated to the GPU. For example, unused power allocated to the USB device is used by the GPU on a real time basis.

In some implementations, the shifting of the power between the USB device and the GPU includes using the allocated power of the USB device to increase or decrease GPU performance such as an image rendering quality and/or frame rate output by the GPU while leaving one or more of a frequency and/or voltage setting of the GPU at a current level. In other implementations, frequency and/or voltage is adjusted to provide increased or decreased GPU performance.

In some implementations, GPU performance in the form of pixel render quality and frame rate is determined based on the level of shifted power to meet critical application metrics for applications that are executing using the GPU. For example, when power is allocated from the USB device back to the GPU, the GPU improves frame rate, pixel quality such as employing improved anti-aliasing, or other operations to improve the image quality generated by the GPU. When the USB device is reallocated power or provided increased power, the GPU in some implementations, decreases the GPU performance such as frame rate and/or image quality without reducing a frequency or voltage used by the GPU in the process of shifting USB allocated power back to the USB port for use by the USB device.

FIG. 1 illustrates one example of a computing device 100 that includes a USB port 102, a graphics processing unit 104, a power delivery (PD) controller 106 that interfaces with the USB port 102 and a power regulator 108. If desired, a processor 110, such as a central processing unit (CPU), or other suitable processor is employed that executes applications that utilizes the graphics processing unit 104 to generate video, 3D graphics data (e.g., games, overlays, virtual reality output), audio or any other output provided by the GPU to one or more USB devices and/or displays (not shown) or for providing image output to other devices. A USB device 112 is connectable to the USB port 102. The USB device 112 for purposes of illustration only will be referred to as a virtual reality headset. However, in other implementations different USB devices are employed. In addition, the USB device 112 by way of example is a USB-C device and the USB port 102 in this example is a USB-C port. However, any suitable USB port can be employed. The power regulator 108 provides power 114 to the USB port 102 for use by the USB device 112 when the USB device is connected to the USB port 102. In some implementations, power regulator 108 provides power telemetry information 116 for real time power consumption monitoring of the USB device to the power delivery controller 106 and/or the GPU 104 as shown by dashed lines 118. Power telemetry information 116 includes by way of example, voltage and current levels being provided by the power regulator 108 to the USB device 112 and/or the GPU 104.

The GPU 104 in one example includes one or more GPU cores and in other implementations is a stand-alone chip, a system on chip, GPU core integrated with the processor 110 on a common chip if desired or in any other suitable configuration. The GPU includes USB power shifting logic 120, in this example, implemented as firmware, stored in memory such as ROM or any other suitable memory, executing by one or more processors in a GPU core. However, any suitable GPU configuration is employed in other implementations. The USB power shifting logic 120 in one example, uses USB power shifting registers 122 to store information used to control power shifting between the GPU 104 and USB device 112 under control of the PD controller 106. When the USB device 112 is consuming less power than is allocated for it, the GPU 104 shifts the extra or unused power to the GPU 104. The GPU 104 changes its operating performance without changing its frequency and voltage levels in some implementations.

With a static approach, the GPU 104 shifts the unused power once at the same time the USB device 112 is connected to the USB port 102. In other implementations, a dynamic approach is used instead of, or in addition to, the static approach and shifts different magnitudes of the unused power. In such implementations, the power is shifted such that the GPU 104 gets an amount of extra power budget that was not used by the USB device 112 that varies in magnitude according to the real time power consumption of the USB device 112. Increased GPU power performance results when the power is adjusted from the USB device 112 to the GPU 104. The interconnection of the GPU 104 to the power delivery controller 106, processor 110 and power regulator 108 may be done in any conventional manner and in some implementations is done using interrupt driven retrieval of USB power information from the power delivery controller 106 through suitable general purpose input/output connections, through suitable bus connections or in any other suitable manner.

Figure 2:
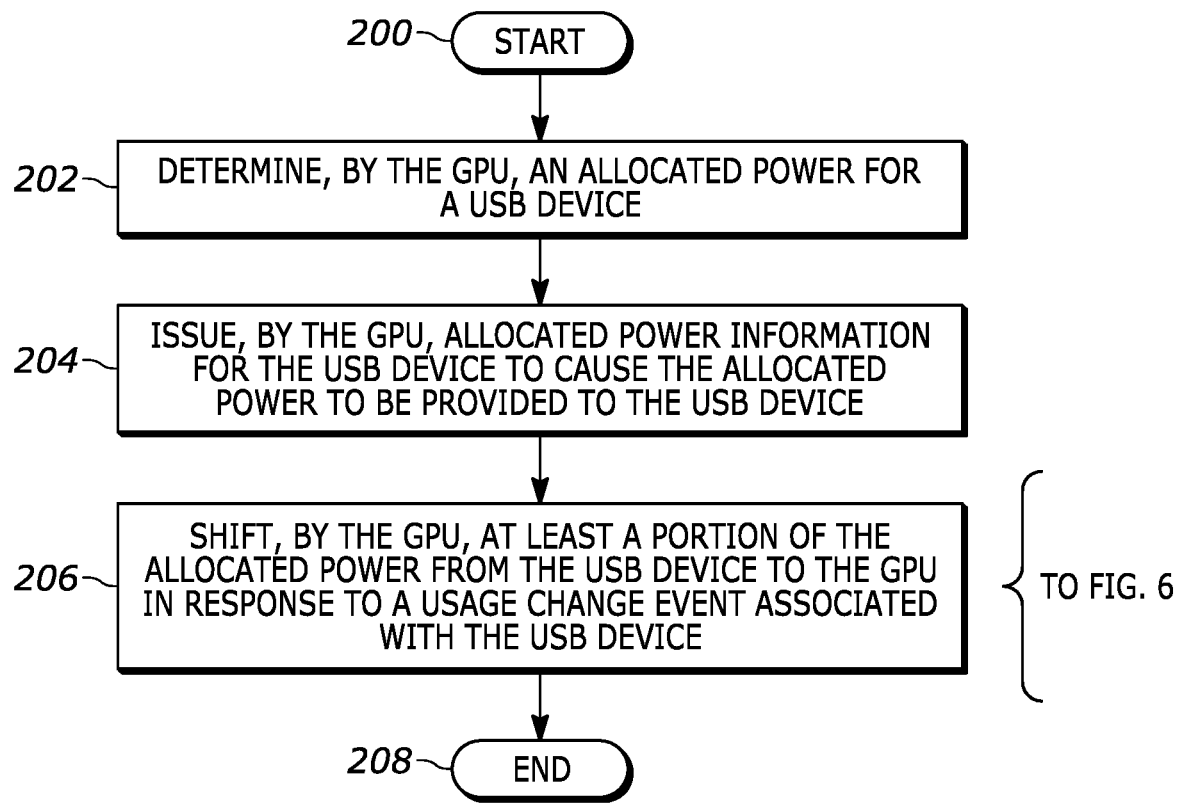
FIG. 2 is a flowchart illustrating one example of a method for controlling power consumption of a graphics processing unit in accordance with one example set forth in the disclosure.

Referring also to FIG. 2, a method of operation of the GPU 104 is shown. As shown in block 200, the method starts, for example, by computing device 100 initialization or in any other suitable manner. As shown in block 202, the GPU 104 determines an allocated power for the USB device 112. For example, the USB power shifting logic 120 allocates a maximum power that the USB device 112 is capable of consuming. In some implementations this is a default power. For example, the GPU 104 as a subsystem of the computing device 100 is assigned 300 watts as part of an initialization operation. The GPU 104, in one example, assigns 10% of its 300 watt allocation, namely 30 watts, to be allocated to the USB device 112. As shown in block 204, the USB power shifting logic 120 provides the allocated power information 126, in this example, 30 watts, to cause the allocated power to be provided by the power regulator 108 to the USB device 112. In this example, the USB allocated power information 126 for the USB device 112 is provided to the power delivery controller 106 which in turn communicates the information to the power regulator 108.

The power delivery controller 106 in one example stores the USB allocated power information 126 in a database or a table on a per-USB device basis. If the USB device 112 is connected to the USB port 102, the 30 watts is provided to the USB device 112. However, if the USB device is not connected, as shown in block 206, the method includes shifting, by the GPU, at least a portion of the allocated power from the USB device 112 to the GPU in response to a usage change event associated with the external USB device. In other implementations, if the USB device is connected, but monitoring of actual power use of the USB device shows the device does not require the total 30 watts, the PD controller 106 informs the GPU 104 and the GPU 104 uses the unused power to improve its operation.

In a static operation, the magnitude of the USB allocated power is constant, meaning that the 30 watt allocated power is the only power level that is allocated to or from the USB device 112. A usage change event is detected by the GPU 104, through the USB port 102 or the power delivery controller 106 when, for example, the USB device is connected or disconnected from the USB port. In the example where the USB device 112 is not connected, the GPU shifts the 30 watt power allocation back to the GPU so that the GPU now can employ all 300 watts of the total allocated power. When the USB device 112 is detected as being connected, the GPU 104 receives device information 128 indicating, for example, that a device is connected, the type of device being connected and its operational parameters that are relevant for the GPU 104. For example, operational parameters include the display resolution of the virtual headset (when a virtual headset is the USB device), the maximum power to be used by the USB device when it is connected and any other suitable information. When the USB device is connected, the GPU 104 reallocates the allocated power back to the USB device. As such, the GPU identifies opportunities to shift (reallocate) power between the USB device 112 and the GPU 104 while at the same time keeping the subsystem total power budget (e.g., 300 watts) from exceeding its maximum level.

The process then continues as shown in block 208 so that the power allocated to the USB device 112 is reallocated or shifted back to the GPU 104 when the USB device 112 is not connected to the USB port 102. The reallocated power is then used by the GPU 104 to improve performance. For example, the GPU adjusts its pixel render quality by applying anti-aliasing or multiple passes of anti-aliasing to improve output image quality of an image frame. In some implementations, the GPU increases the frame rate output for higher quality image perception by a user or adjusts any other performance operation by using the reallocated power. In one example, the improved performance is done without increasing the frequency of operation of the GPU or increasing the voltage level of the GPU.

Figure 3:
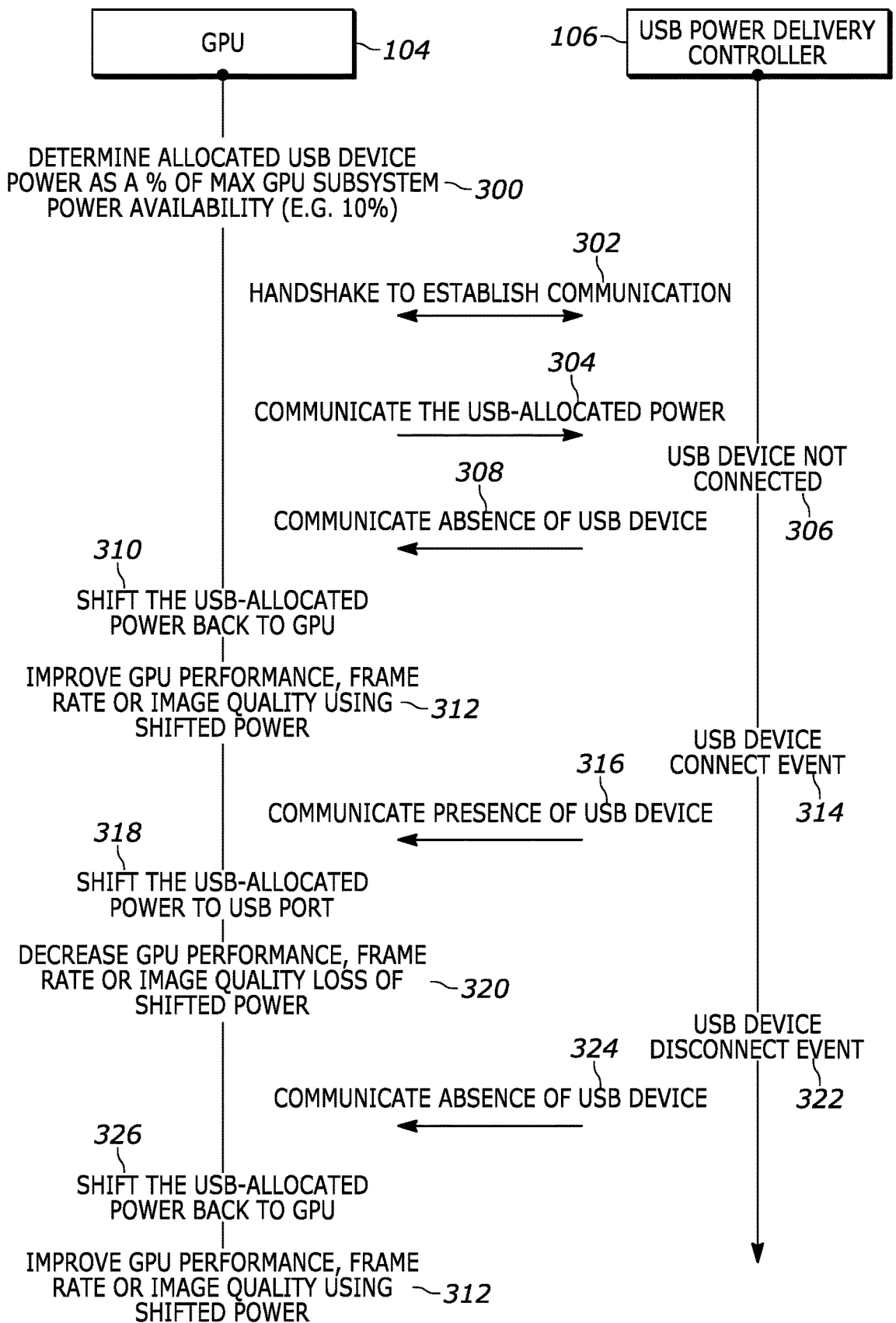
FIG. 3 is a diagram illustrating operation and a communication flow with a USB device in accordance with one example set forth in the disclosure.

Referring also to FIG. 3, a communication and operation diagram illustrates communication between the GPU 104 and the power delivery PD controller 106. In this example, the GPU 104 determines the allocated power for the USB device 112 as part of a firmware initialization process wherein the USB device 112 is allocated a maximum or default power that the device is capable of consuming based on a predetermined percentage. Using the previous example of 300 watts for the maximum GPU subsystem power availability, 10% is determined as a default allocated power level (30 watts) for the USB device 112 as shown by operation 300. An initialization handshake operation 302 is performed between the GPU 104 and the USB power delivery controller 106 to establish a communication link. The GPU 104 issues the allocated power information 126 shown as communication 304 to the USB power delivery controller 106. In this example, a 30 watt power allocation is provided by the GPU 104 to the PD controller 106.

As illustrated at operation 306, the USB device 112 is not connected to the USB port as determined by the USB power delivery controller 106. Accordingly, as shown in communication 308, the USB power delivery controller 106 communicates the usage change event 128 of the USB device 112 to the GPU 104 to indicate a disconnect state to the USB device 112. In response to the usage change event communication 308, the GPU 104 shifts the USB allocated power, in this example 30 watts, back to the GPU 104 by, for example, informing the power delivery controller 106 using the USB power allocation via information 126 of the USB allocated adjustment. This is shown as communication 310. The power delivery controller 106 then informs the power regulator 108 to provide the allocated power as shown via power line 130 so that the GPU 104 can use the power that was previously allocated to the USB device 112 for the GPU 104 instead. The shifting of the power to the GPU 104 from the USB device 112 allows the GPU 104 to improve its performance.

For example, as shown in block 312, the GPU 104 improves performance, in one example, by increasing the frame rate and/or image quality produced by the GPU 104 by employing anti-aliasing or other image enhancement operation using the shifted power. As shown by communication 314, when the USB device 112 connect event is detected by the power delivery controller 106, device information is provided to the GPU 104 as part of the usage change event 128 and the USB power delivery controller 106 communicates the presence of the USB device 112 as shown in communication 316 by providing the device information to the GPU 104. Because the USB device 112 is now connected, the GPU 104 shifts the USB allocated power back to the USB port 102 as shown by operation 318. For example, the USB power shifting logic 120 informs the power delivery controller 106 to allocate 30 watts back to the USB device 112. The power delivery controller 106 then informs the power regulator 108 (provides information 126) to provide the power 114 through the USB port 102 to the USB device 112. The GPU 104 then decreases its performance by one or more of reducing the frame rate output by the GPU, reducing the image quality compared to the image quality and frame rate provided when the GPU was using the USB device allocated power or other performance parameter. This is shown in block 320. When a USB device 112 disconnect event is detected as shown in 322, the USB power delivery controller 106 communicates the absence of the USB device 112 to the GPU 104 as shown in communication 324. The GPU 104 then shifts the USB allocated power back to the GPU 104 as shown in operation 326 and performs the GPU performance improvement operation using the USB allocated power. The operation continues by allocating the maximum power allocation of the USB device 112 back to the GPU 104 and vice versa depending upon whether the USB device is connected or not.

Figure 4:
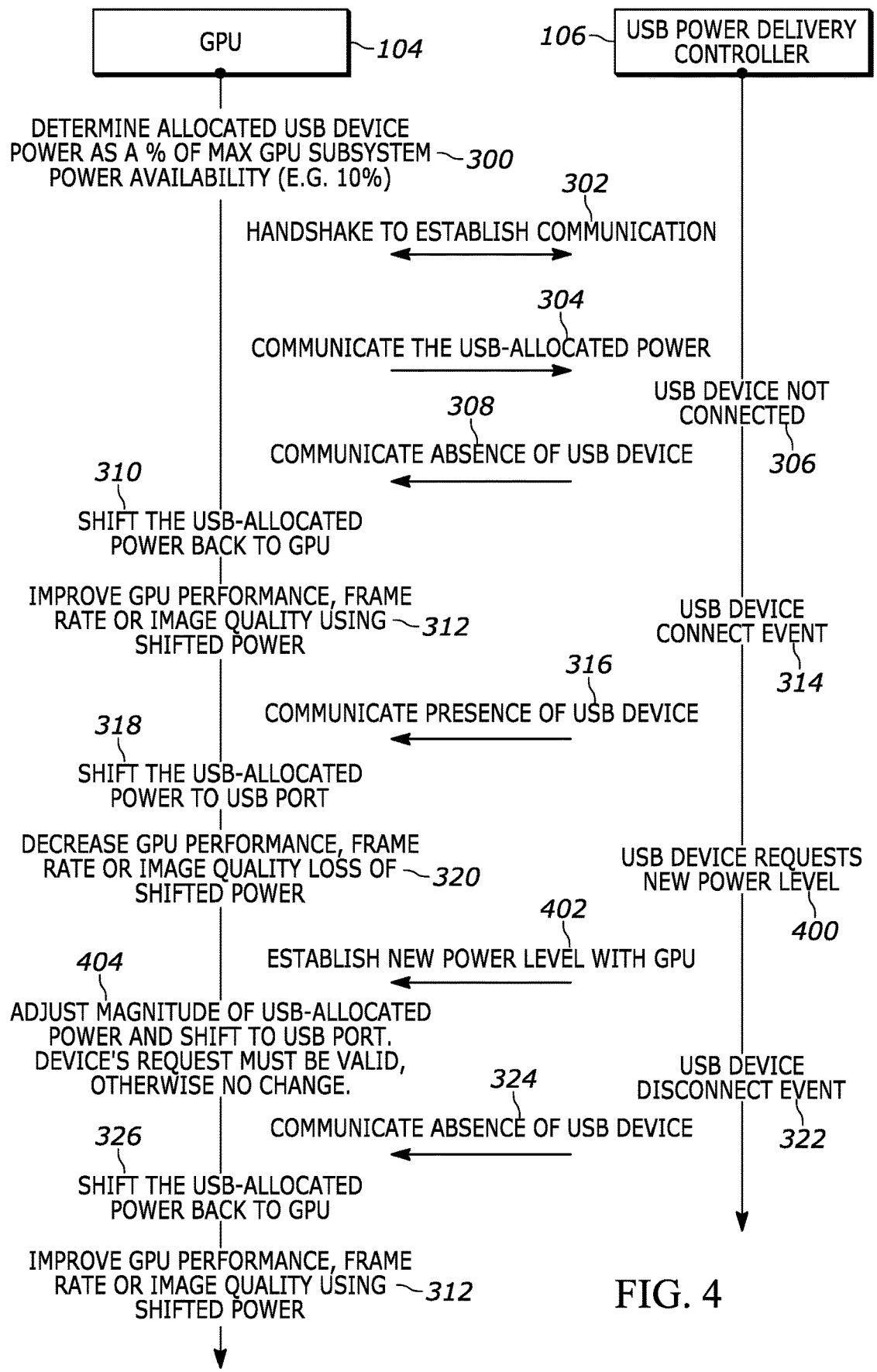
FIG. 4 is a diagram illustrating operation and a communication flow with a USB device in accordance with one example set forth in the disclosure.

FIG. 4 illustrates another example of the USB power shifting operation that employs a dynamic approach and is different from that described with respect to FIG. 3 in that the magnitude of the USB allocated power is varied upon request from the USB device 112 for a new power level. As such, the magnitude of the USB allocated power is not constant in this example. Operations are similar to those shown in FIG. 3 but as shown by operation 400, in this example, the USB device 112 issues a power request 131 (see FIG. 1) to request a different power level than the allocated 30 watts. In this example, the USB device 112 requests a lower power level, but a higher power level than the original allocated power established in operation 300 in some implementations is also be requested. However, the request for a different power must be valid, otherwise it will not be accepted. This means, for example, that if the power requested by the USB device 112 is greater than a maximum allowable allocated in block 300, the USB power shifting logic 120 will ignore the request. The USB power delivery controller 106 records and sends the power request 131 as received from the USB device to the GPU 104.

As shown by operation 404, the GPU 104 adjusts the magnitude of the USB allocated power based on the request 131. For example, in the case where the USB device 112 asks for 20 watts but was allocated 30 watts, the GPU 104 allocates the unused 10 watts to the GPU 104 and improves GPU performance as previously described. The GPU 104 informs the power delivery controller 106 of the new newly accepted lower power allocation (information 126). The PD controller 106 then informs the power regulator 108 to reduce the power for the USB device 112 to 20 watts instead of 30 watts and provide the additional 10 watts to the GPU 104. Prior to approving the request, the power request 131 is checked against a power control policy by the GPU 104 such as data representing that the request 131 cannot request power above a maximum amount or must be within a desired range or that the request must be within a particular duration from a previous request to avoid undesirable power oscillation occurring in the GPU and/or USB device. Any other suitable policy considerations are also employed.

Figure 5:
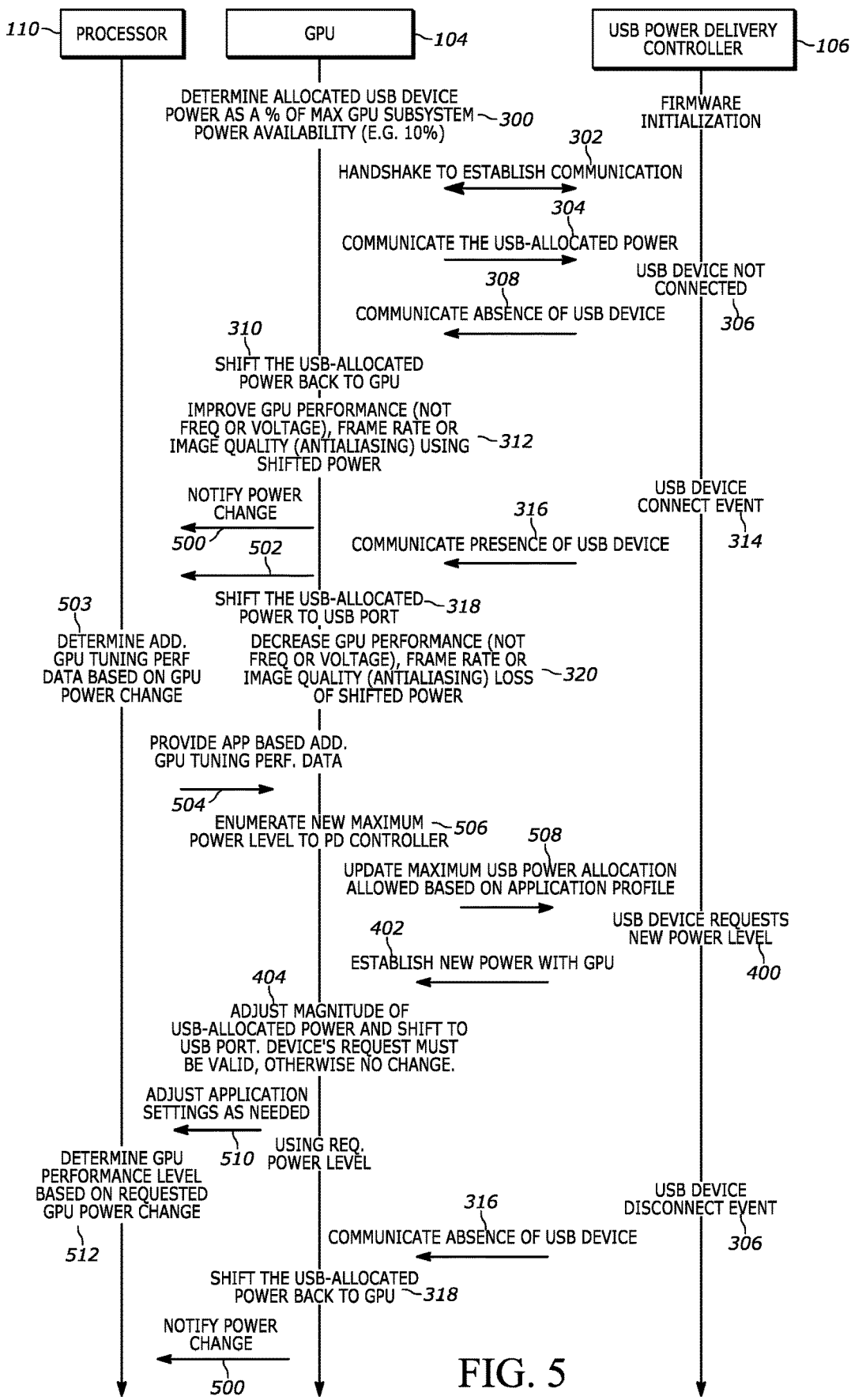
FIG. 5 is a diagram illustrating operation and a communication flow with a USB device in accordance with one example set forth in the disclosure.

FIG. 5 illustrates an example of a dynamic GPU based power shifting operation where, in this example, application based feedback is employed by the processor 110 executing a driver. The processor 100 serves as GPU performance tuning logic 132 to facilitate additional GPU performance tuning in addition to the performance tuning determined by the USB power shifting logic 120. The processor 110 also employs application profile database 134 that includes additional GPU tuning performance data for a particular application and for a particular GPU. This data in some implementations is supplied by the application provider, in other implementations it is determined empirically by the GPU vendor and in other implementations it is provided from any other source. The application profile database 134 includes data that represents, for example, various power levels and associated GPU performance tuning criteria that occurs at the various power levels. Examples of the additional GPU tuning performance data are shown in Tables 1 and 2 below.

TABLE 1

| Application | GPU subsystem power availability | GPU ID | USB Device ID | GPU ideal power allocation | USB Device power allocation | App Based tuning |
|---|---|---|---|---|---|---|
| A | 100 W | G | V | 90 W | 10 W | Image quality |
| B | 100 W | G | V | 92 W | 8 W | Frame rate + image quality |

TABLE 2

| Application | GPU allocated power | Frame rate setting | Quality setting |
|---|---|---|---|
| A | 90 W | 90 | 100 |
| A | 60 W | 60 | 90 |

In this example, the GPU 104 provides information 133 (FIG. 1) to the GPU performance tuning logic 132 via communication 500 that the USB device 112 is connected and the GPU 104 has shifted USB allocated power from the GPU 104 to the USB device 112. The GPU performance tuning logic 132 looks up the power level provided by the GPU in the profile database 134 to determine the additional GPU tuning performance data for the given power level for the particular application that is executing on the processor 110. Because the GPU power decreased, the GPU performance will decrease. The GPU 104 shifts the USB allocated power back to the USB port 102 and decreases GPU performance. The profile database 134 is used as the basis for determining, for example, a frame rate reduction or image quality reduction.

In this example, because the USB device 112 has been connected, the GPU available power is reduced and accordingly, the GPU performance tuning logic 132 looks up in the table the corresponding GPU power that is to be used. As such, the GPU 104 as part of communication 502 provides information 135 indicating the power levels for the USB device and GPU device. Alternatively, the GPU performance tuning logic 112 determines the information if desired. The GPU performance tuning logic 132 determines additional GPU tuning performance data 503 by looking up the tuning performance data in the table and sends the additional GPU tuning performance data 137 via communication 504 to the GPU 104 and the GPU 104 further decreases or changes its GPU performance. Although the GPU already decreased its GPU performance as shown by block 320 (e.g., by reducing the frame rate output by the GPU and/or reducing output image quality such as reducing anti-aliasing from a 4× to a 2× anti-aliasing process), the additional GPU tuning performance data 137 provides additional GPU performance reduction data to the GPU. For example, the data 137 in one example controls the GPU to generate 1080p image frames and upscale the frames to a 4K format instead of processing all of the frames in a 4K format (which uses more bandwidth and power) where the USB device 112 coupled to the GPU uses a 4K display format. Any other suitable additional tuning performance data is also employed.

As shown by communication 506, the tuning performance data 137, in one example, changes the USB device 112 power level that is different from the requested USB device power level 131 and in other implementations maintains the same power level. For example, if the profile database 134 indicates that an even lower USB device power level can be appropriate for a given application the GPU performance tuning logic 132 instead provides data indicating that the USB device 112 should employ a lower power level. This power level information is provided from the GPU 104 to the PD controller 106 shown as communication 506. Communication 508 illustrates the GPU updating the PD controller 106 to have a USB device power allocation to be the maximum allowed based on the tuning performance data 137.

As shown by communication 400, the USB device can request a new power level previously described with respect to FIG. 4. The GPU 104 informs the GPU performance tuning logic 132 in communication 510 that additional tuning performance data is requested based on a new USB device power level request. As shown by block 512, the GPU performance tuning logic 132 determines the additional GPU tuning performance data from the application profile database 134. The process then continues depending upon whether the USB device is disconnected or requests another different power level.

Figure 6:
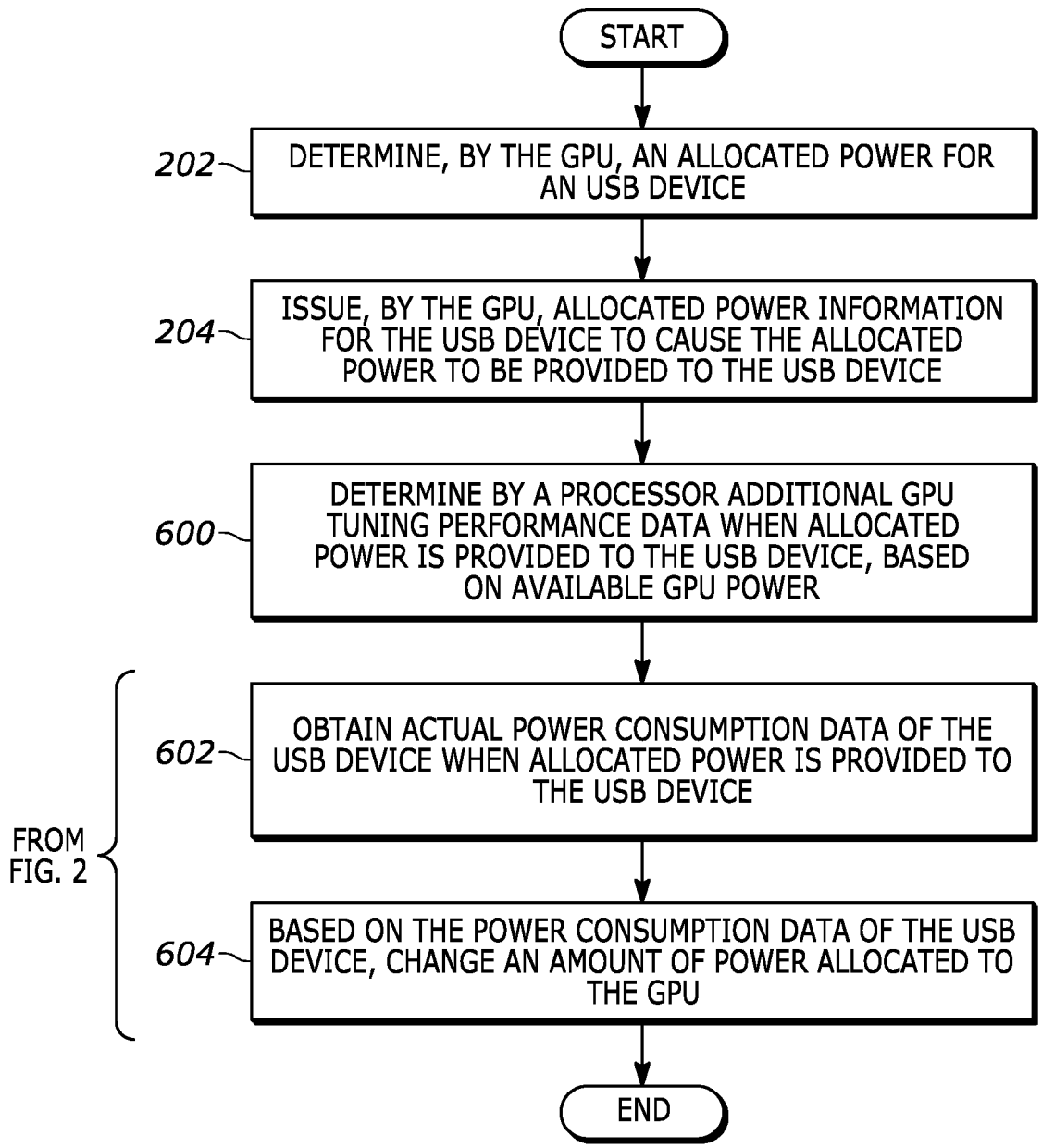
FIG. 6 is a flowchart illustrating one example of a method for controlling power consumption of a graphics processing unit in accordance with one example set forth in the disclosure.

Referring to FIG. 5 and FIG. 6, a method of controlling power in a GPU that provides dynamic and real time power consumption monitoring will be described. As shown by block 600, the GPU performance tuning logic 132 determines additional GPU tuning performance data, in this example pixel render quality, when the allocated power for the USB device is provided to the USB device. The determination of additional GPU tuning performance data is done based on available GPU power as shown in Table 1. As such, the application executing on the processor is used to provide additional control of the GPUs performance in response to the available GPU power provided to the GPU performance tuning logic 132. For example, as described with respect to FIG. 5, when the USB device is connected to the USB port and is using the maximum allocated power, the GPU 104 decreases the performance when the power is reallocated from the GPU to the USB device. In addition, a further type of performance tuning is determined by the GPU performance tuning logic 132, such as an executing driver that uses the profile database 134 to determine what power quality adjustments should be made at which power levels.

As shown in block 602, the method also includes obtaining, in one example, periodically in real time, actual power consumption data of the USB device when the allocated USB power is provided to the USB device. As such, when the USB device is connected, and the allocated power is being provided to the USB device, power telemetry data 116 is obtained from the power regulator 108 by the power delivery controller 106. The power telemetry information 116 includes voltage and current levels currently being provided by the power regulator 108 to the USB port 102. As such, by employing periodic power usage monitoring of the USB device 112, the GPU 104 can adjust its performance accordingly and allocate unused USB power on a real time basis when the USB device is actually using less power than allocated to it, or the GPU can reduce its operating performance when the USB device starts using more power than previously used (but still less than the maximum amount allocated). As such, as shown in block 604, the GPU 104 changes the amount of power that is allocated to the GPU 104 to provide a dynamic and real time monitoring operation with application feedback, based on the power consumption data.

Figure 7:
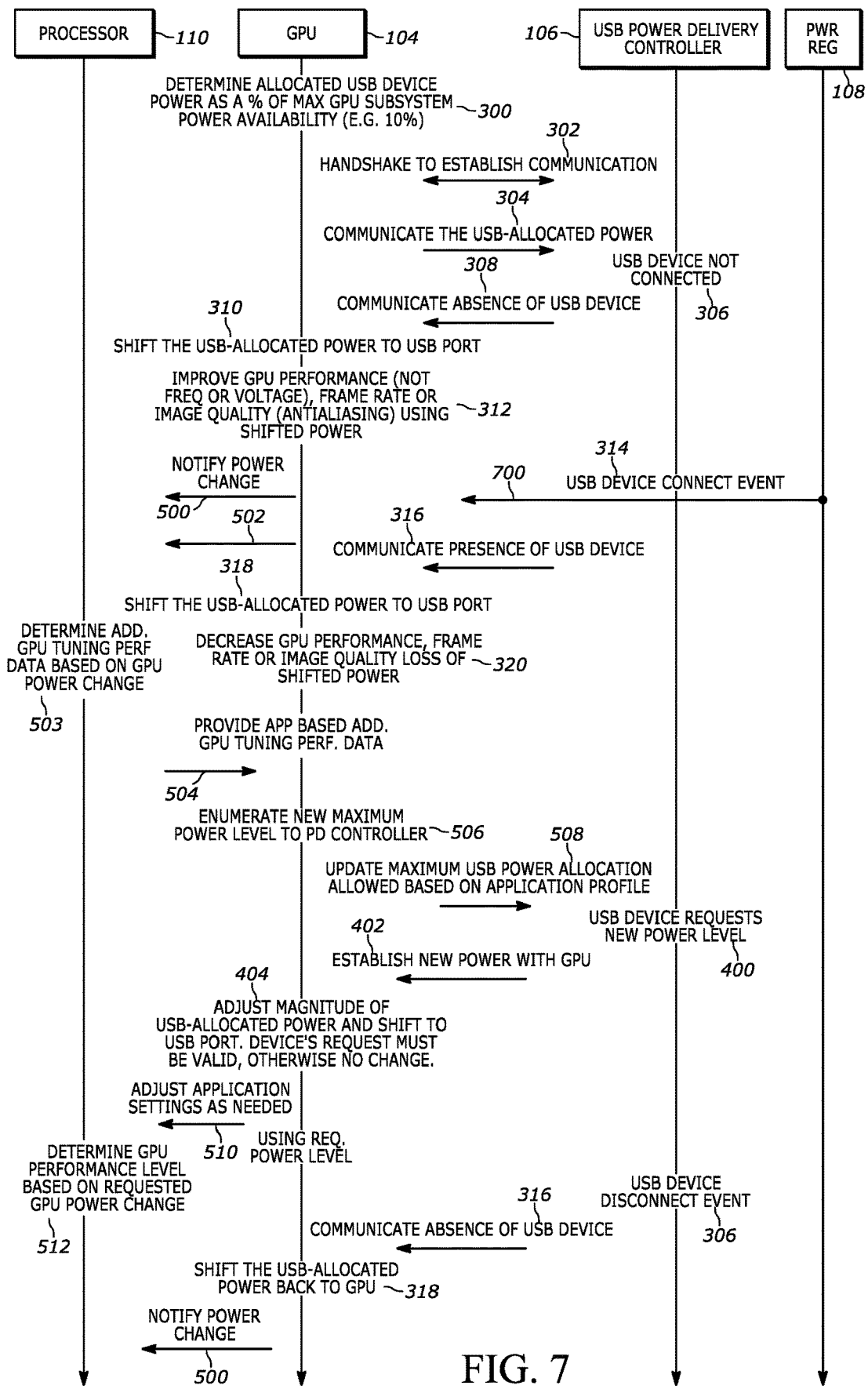
FIG. 7 is a diagram illustrating operation and a communication flow with a USB device in accordance with one example set forth in the disclosure.

FIG. 7 illustrates operation and communication flow for the method shown in FIG. 6. As shown, the power consumption data is communicated in communication 700 as power telemetry data 116 from the power regulator 108 to the GPU 104 either directly as shown by dashed line 118 (FIG. 1) or through the PD controller 106. The USB power shifting logic 120 uses the real time USB power consumption data and determines the remaining power available to the GPU based on the allocated GPU power and provides the GPU 104 and USB device power consumption information 500 to the processor 110. The GPU performance tuning logic 132 provides back to the GPU 104 the additional GPU tuning performance data 137 to additionally control the GPU performance of the GPU.

Figure 8:
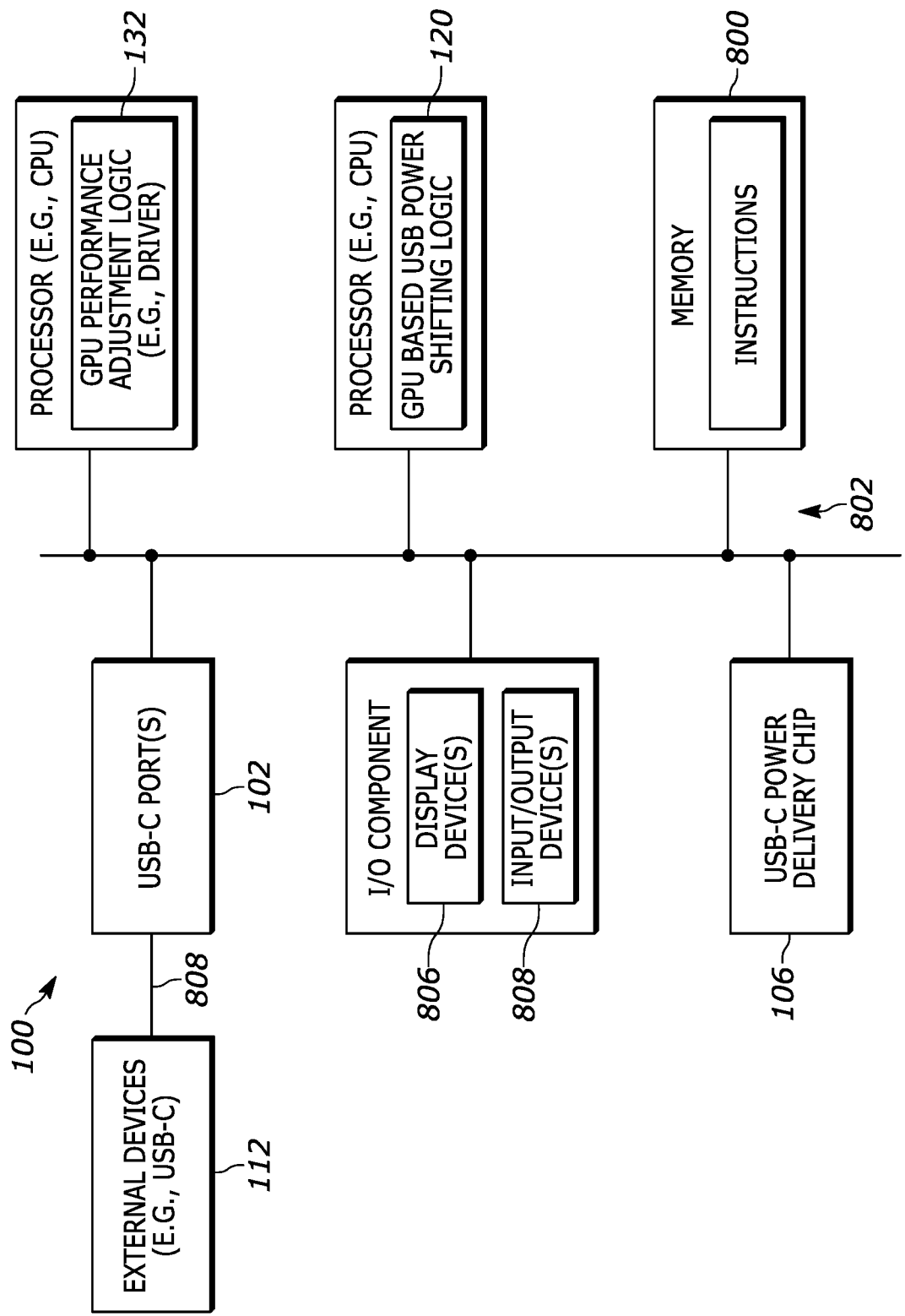
FIG. 8 is a block diagram illustrating a computing device in accordance with one example set forth in the disclosure.

FIG. 8 is a block diagram generally illustrating the computing device 100 and illustrates memory 800 that is one or more memory products that stores executable instructions that when executed, causes the GPU and/or CPU to perform the operations described herein. The memory 800 in one example is distributed memory within the computing device or outside of the computing device including but not limited to integrated ROM in the GPU and CPU and in some implementations is available through suitable bus structure shown as 802 and in some implementations the memory includes RAM or ROM implemented in any suitable manner. The computing device 100 in this example, includes other input/output components such as display devices 806 and input/output devices 808 such as keyboards, touch screens or any other suitable input/output devices. The devices are interconnected as known in the art and illustrated with bus structure 802 as well as interconnection 808. Also, the USB power delivery controller in one example is a processor that executes firmware that stores the firmware in memory (e.g., ROM) such that the memory stores executable instructions that when executed, causes the USB power delivery controller to operate as described herein.

As described above, the GPU provides an improved power usage efficiency with USB devices. GPU performance is improved by shifting unused power from the USB device for the GPU. The improved performance in some implementations results in an improved image quality by increasing an output frame rate and/or pixel rendering quality for output frames.

The above detailed description and the examples described therein have been presented for the purposes of illustration and description only and not for limitation. For example, the operations described are done in any suitable manner. The operations described herein are be performed in any suitable order and the order provided is only given for purposes of example. It is therefore contemplated that the present implementations cover any and all modifications, variations or equivalents that fall within the scope of the basic underlying principles disclosed above and claimed herein. Furthermore, while the above description describes hardware in the form of a processor executing code, hardware in the form of a state machine or dedicated logic capable of producing the same effect, other structures are also contemplated.

What is claimed is:

1. A method for controlling power consumption of a graphics processing unit (GPU) in a first device comprising:
    determining, by the GPU that is operative to produce at least graphics data, an allocated power for a USB device;
    issuing, by the GPU, allocated power information for the USB device to cause the allocated power to be provided to the USB device; and
    shifting, by the GPU, at least a portion of the allocated power from the USB device to the GPU in response to a usage change event associated with the USB device.

2. The method of claim 1 wherein shifting by the GPU comprises using the allocated power shifted from the USB device to change a GPU performance level while leaving one or more of a frequency and voltage setting of the GPU at a current level.

3. The method of claim 1 wherein shifting by the GPU comprises using the allocated power shifted from the USB device to change a GPU performance level, and the method further comprising:
    determining, by a processor coupled to the GPU, additional GPU tuning performance data when allocated power is provided to the USB device, based on available GPU power; and
    using by the GPU, the additional tuning performance data to change GPU performance when the allocated power is shifted from the USB device to the GPU.

4. The method of claim 1 further comprising shifting, by the GPU, at least a portion of the allocated power back to the USB device in response to another usage change event.

5. The method of claim 1 wherein determining, by the GPU, the allocated power for the USB device is based on power usage requirements of the GPU and based on power usage requirements of the USB device.

6. The method of claim 1 wherein shifting, by the GPU, at least the portion of the allocated power from the USB device to the GPU comprises at least one of: maintaining an amount of allocated power constant or changing an amount of allocated power upon request from the USB device.

7. The method of claim 1 comprising:
determining, by a processor coupled to the GPU, additional GPU tuning performance data when allocated power is provided to the USB device, based on available GPU power;
using, by the GPU, the additional tuning performance data to change GPU performance when the allocated power is shifted from the USB device to the GPU; and
wherein shifting, by the GPU, at least the portion of the allocated power comprises:
obtaining power consumption data of the USB device when allocated power is provided to the USB device; and
based on the power consumption data of the USB device, changing an amount of power allocated to the GPU.

8. A computing device comprising:
at least one universal serial bus (USB) port;
a power delivery controller operatively coupled to the USB port;
at least one graphics processing unit (GPU) that is operative to produce at least graphics data, operatively coupled to the power delivery controller and to the USB port, configured to:
determine an allocated power for a USB device connectable through the USB port;
issue allocated power information to the power delivery controller for the USB device to cause the allocated power to be provided to the USB device; and
shift, at least a portion of the allocated power from the USB device to the GPU in response to a usage change event associated with the USB device.

9. The computing device of claim 8 wherein the GPU is operative to use the allocated power shifted from the USB device to change a GPU performance level while leaving at least one of: a frequency and voltage setting of the GPU at a current level.

10. The computing device of claim 8 wherein shifting by the GPU comprises using the allocated power shifted from the USB device to change a GPU performance level, and wherein the computing device further comprises:
a processor, operatively coupled to the GPU, configured to:
determine additional GPU tuning performance data when allocated power is provided to the USB device, based on available GPU power; and
using by the GPU, the additional tuning performance data to change GPU performance when the allocated power is shifted from the USB device to the GPU.

11. The computing device of claim 8 wherein the GPU is configured to shift, at least a portion of the allocated power back to the USB device in response to another usage change event.

12. The computing device of claim 8 wherein the GPU is configured to determine the allocated power for the USB device based on power usage requirements of the GPU and based on power usage requirements of the USB device.

13. The computing device of claim 8 wherein the GPU is configured to shift at least the portion of the allocated power from the USB device to the GPU by at least one of: maintaining an amount of allocated power constant or changing an amount of allocated power upon request from the USB device.

14. The computing device of claim 8 further comprising a processor operatively coupled to the GPU, operative to:
determine additional GPU tuning performance data when allocated power is provided to the USB device, based on available GPU power;
in response to the determination of the additional GPU tuning performance data, using, by the GPU, the additional tuning performance data to change GPU performance when the allocated power is shifted from the USB device to the GPU; and
wherein the GPU is operative to shift at least the portion of the allocated power by:
obtaining power consumption data of the USB device when allocated power is provided to the USB device; and
based on the power consumption data of the USB device, changing an amount of power allocated to the GPU.

15. A non-transitory storage medium product comprising executable instructions stored thereon that when executed by one or more graphics processing units (GPU's) that is operative to produce at least graphics data, causes the one or more GPU's to:
determine an allocated power for a USB device;
issue allocated power information for the USB device to cause the allocated power to be provided to the USB device; and
shift at least a portion of the allocated power from the USB device to the GPU in response to a usage change event associated with the USB device.

16. The non-transitory storage medium product of claim 15 comprising executable instructions stored thereon that when executed by one or more graphics processing units (GPU's), causes the one or more GPU's to use the allocated power shifted from the USB device to change a GPU performance level while leaving at least one of: a frequency and voltage setting of the GPU at a current level.

17. The non-transitory storage medium product of claim 15 comprising executable instructions stored thereon that when executed by one or more graphics processing units (GPU's), causes the one or more GPU's to use the allocated power shifted from the USB device to change a GPU performance level, and use additional GPU tuning performance data obtained from a processor to change GPU performance when the allocated power is shifted from the USB device to the GPU.

18. The non-transitory storage medium product of claim 15 comprising executable instructions stored thereon that when executed by one or more graphics processing units (GPU's), causes the one or more GPU's to shift at least a portion of the allocated power back to the USB device in response to another usage change event.

19. The non-transitory storage medium product of claim 15 comprising executable instructions stored thereon that when executed by one or more graphics processing units (GPU's), causes the one or more GPU's to determine the allocated power for the USB device based on power usage requirements of the GPU and based on power usage requirements of the USB device.

20. The non-transitory storage medium product of claim 15 comprising executable instructions stored thereon that when executed by one or more graphics processing units (GPU's), causes the one or more GPU's to:
use additional tuning performance data provided by a processor, to change GPU performance when the allocated power is shifted from the USB device to the GPU; and
shift the at least portion of the allocated power by:

obtaining power consumption data of the USB device when allocated power is provided to the USB device; and based on the power consumption data of the USB device, changing an amount of power allocated to the GPU.

\* \* \* \* \*